United States Patent
Shmuel et al.

(10) Patent No.: US 11,203,153 B2
(45) Date of Patent: Dec. 21, 2021

(54) POWDER BIN FOR ADDITIVE MANUFACTURING SYSTEM

(71) Applicant: Applied Materials, Inc., Santa Clara, CA (US)

(72) Inventors: Erez Shmuel, Saratoga, CA (US); Mahendran Chidambaram, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 215 days.

(21) Appl. No.: 16/653,912

(22) Filed: Oct. 15, 2019

(65) Prior Publication Data
US 2021/0107222 A1   Apr. 15, 2021

(51) Int. Cl.
| | |
|---|---|
| *B29C 64/25* | (2017.01) |
| *B29C 64/255* | (2017.01) |
| *B29C 64/245* | (2017.01) |
| *B33Y 30/00* | (2015.01) |
| *B29C 64/153* | (2017.01) |

(52) U.S. Cl.
CPC .......... *B29C 64/255* (2017.08); *B29C 64/245* (2017.08); *B29C 64/153* (2017.08); *B33Y 30/00* (2014.12)

(58) Field of Classification Search
CPC ... B29C 64/307; B29C 64/357; B29C 64/364; B29C 64/25; B29C 64/255; B29C 64/259; B29C 64/245; B22F 12/30; B22F 12/38; B22F 12/50
See application file for complete search history.

(56) References Cited

U.S. PATENT DOCUMENTS

| | | | |
|---|---|---|---|
| 2016/0236422 A1 | 8/2016 | Sakura | |
| 2017/0072636 A1 | 3/2017 | Ng et al. | |
| 2017/0341365 A1* | 11/2017 | De Lajudie | B29C 64/10 |
| 2019/0134751 A1* | 5/2019 | Hofmann | B23K 26/034 |
| 2020/0238607 A1* | 7/2020 | Giulietti | B29C 64/153 |

FOREIGN PATENT DOCUMENTS

| | | |
|---|---|---|
| CN | 106077625 | 11/2016 |
| JP | 2002-205338 | 7/2002 |
| KR | 10-2017-0014323 | 2/2017 |
| WO | WO 2014/039378 | 3/2014 |

OTHER PUBLICATIONS

PCT International Search Report and Written Opinion in International Appln. No. PCT/US2020/055388, dated Jan. 29, 2021, 9 pages.

* cited by examiner

*Primary Examiner* — Joseph S Del Sole
*Assistant Examiner* — Jamel M Nelson
(74) *Attorney, Agent, or Firm* — Fish & Richardson P.C.

(57) ABSTRACT

A powder bin for an additive manufacturing apparatus has a plurality of walls forming an annular body to surround a build plate. The plurality of walls include an annular outer wall and an annular inner wall that are separated by a cavity, and a gap between a top edge of the inner wall and a top edge of the outer wall is configured to receive powder between the top edges of the outer walls and the inner walls. The annular body has an aperture that extends laterally through the inner wall and outer wall. A base is connected to a bottom edge of the outer wall and a bottom edge of the inner wall, and the base includes one or more ports. A sloped barrier is positioned in the cavity configured to direct powder around the aperture to the one or more ports in the base.

21 Claims, 7 Drawing Sheets

POWDER BIN FOR ADDITIVE MANUFACTURING SYSTEM

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of thin layers of raw material (e.g., powders, liquids, suspensions, or molten solids). In contrast, traditional machining techniques involve subtractive processes in which objects are cut out from a stock material (e.g., a block of wood, plastic, composite, or metal).

A variety of additive processes can be used in additive manufacturing. Some methods melt or soften material to produce layers, e.g., selective laser melting (SLM) or direct metal laser sintering (DMLS), selective laser sintering (SLS), or fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern on the powder to fuse the powder in a region to form a layer of the part. Once the region is fused, the platform is lowered and a new layer of powder is added. The process is repeated until a part is fully formed.

SUMMARY

In one aspect, a powder bin for an additive manufacturing apparatus has a plurality of walls forming an annular body to surround a build plate. The plurality of walls include an annular outer wall and an annular inner wall that are separated by a cavity, and a gap between a top edge of the inner wall and a top edge of the outer wall is configured to receive powder between the top edges of the outer walls and the inner walls. The annular body has an aperture that extends laterally through the inner wall and outer wall. A base is connected to a bottom edge of the outer wall and a bottom edge of the inner wall, and the base includes one or more ports. A sloped barrier is positioned in the cavity configured to direct powder around the aperture to the one or more ports in the base.

Implementations may include on or more of the following features.

One or more projections may be configured to break up a turbulent flow of powder extend from at least one of the plurality of walls inwardly into the cavity. The annular body may be a rectangular body. The annular body may have a first pair of apertures through a first face of the rectangular body and a second pair of apertures through an opposite second face of the rectangular body. The first pair of apertures and the second pair of apertures may be parallel linear slots. The aperture may be a linear slot. The barrier may form a curved slope or a linear slope. A vacuum source may be connected to the ports.

In another aspect, a powder bin assembly for an additive manufacturing apparatus includes a plurality of walls forming an annular body to surround a build plate. The plurality of walls include an annular outer wall and an annular inner wall that are separated by a cavity, and a gap between a top edge of the inner wall and a top edge of the outer wall is configured to receive powder between the top edges of the outer walls and the inner walls. The annular body has an aperture that extends laterally through the inner wall and outer wall. A support structure includes an inner structure positioned within an interior of the powder bin and a strut that extends through the aperture and is moveable in the aperture. A flexible band seal is configured to slide through a channel in the support structure as the support structure move downward and to cover a portion of the aperture above the support structure.

Implementations may include on or more of the following features.

The annular body may be a rectangular body. The annular body may have a first pair of apertures through a first face of the rectangular body and a second pair of apertures through an opposite second face of the rectangular body, and the powder bin may have a plurality of flexible band seals with each band seal of the plurality to cover an associate aperture. The first pair of apertures and the second pair of apertures may be parallel linear slots.

The flexible band seal may be a corrosion resistant material, e.g., stainless steel, chrome, nickel, iron, copper, cobalt, molybdenum, tungsten, and/or titanium. The flexible band seal may have multiple thin layers of different corrosion resistant materials. The channel may pass between an inner structure and a strut of the support structure. The channel may be configured to press a portion of the flexible band seal above the support structure to lie flat against the inner wall. The aperture may be a sealed passage through the body from the inner wall to the outer wall.

Advantages may include one or more of the following. The build surface of the build can remains parallel throughout the additive manufacturing process, even though the build plate is removable from the additive manufacturing system. Leakage of powder out of the build area can be reduced.

The details of one or more implementations are set forth in the accompanying drawings and the description. Other features, aspects, and advantages of the subject matter will become apparent from the description, the drawings, and the claims.

DETAILED DESCRIPTION

Metal powder used in 3D printing can be expensive. Ideally, powder that is not fused during fabrication of a part could be recycled. One solution for recycling unused powder is to form a powder bin with spaced-apart walls surrounding the build plate that enables collection of excess powder in the gap between the walls. Excess powder can be channeled back to a powder reservoir for subsequent use.

However, some powder may fall between the build plate and the walls of the collection bin. Such metal powder can also leak into the internal housing of the additive manufacturing apparatus, resulting in loss of the unused metal powder and potentially damaging electronics and other components of the additive manufacturing apparatus. For example, struts may need to extend through apertures in the walls of the powder collection bin to provide stabilization of the frame that holds the build plate. To block the powder from reaching internal components of the additive manufacturing apparatus, e.g., through an aperture in the wall of the powder bin, a flexible band seal running along the height of the walls enclosing the build plate can provide a seal preventing the powder from leaking out of the build area.

Additionally, due to thermal expansion of components in the additive manufacturing apparatus (e.g., the build plate) and/or the weight of the layers of powder on the build plate, the build plate can tilt. The result can be a skewed or deformed final product. One solution to reduce this deformation of the final product is to use kinematic mounts to support the build plate to ensure the build surface of the build plate remains parallel throughout the additive manufacturing process.

Additive Manufacturing Apparatus

Figure 1:
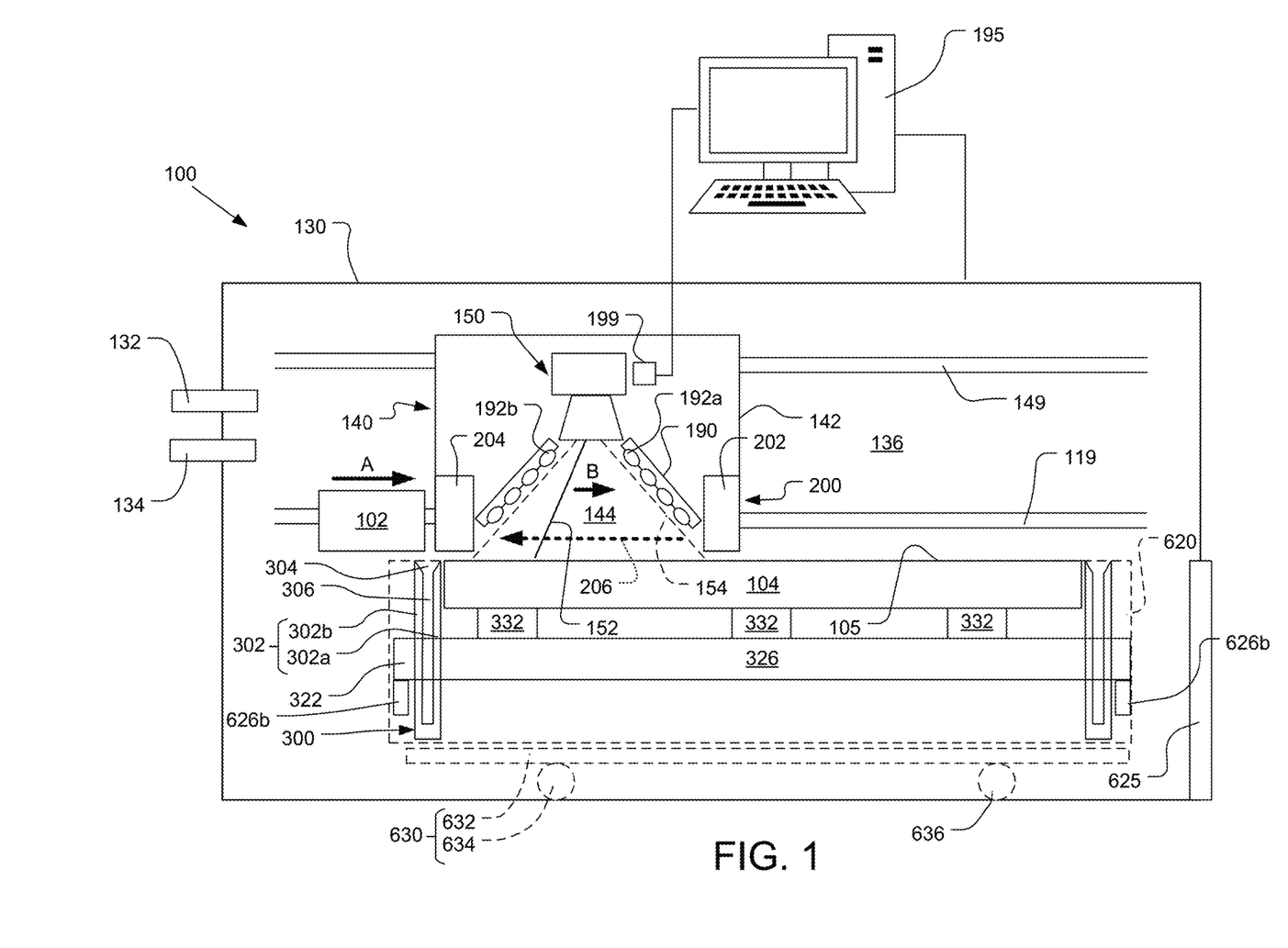
FIG. 1 is a schematic cross-sectional side view of an example additive manufacturing apparatus.

FIG. 1 illustrates a schematic side view of an example additive manufacturing (AM) apparatus 100 that includes a printhead 102 and a build plate 104 (e.g., a build stage). The printhead 102 dispenses layers of one or more powders on a top surface 105 of the platform 104. By repeatedly dispensing and fusing layers of powder, the apparatus 100 can form a part on the build plate 104.

The printhead 102 and the build plate 104 can both be enclosed in a housing 130 that forms a sealed chamber 136, e.g., an atmospheric controlled chamber such as a vacuum chamber, that provides a controlled operating environment. The chamber 136 can include an inlet 132 coupled to a gas source and an outlet 134 coupled to an exhaust system, e.g., a pump. The gas source can provide an inert gas, e.g. Ar, or a gas that is non-reactive at the temperatures reached by the powder for melting or sintering, e.g., N2. This permits the pressure and oxygen content of the interior of the housing 130 to be controlled. For example, oxygen gas can be maintained at a partial pressure below 0.01 atmospheres.

The chamber 136 may be maintained at atmospheric pressure (but at less than 1% oxygen) to avoid the cost and complexity of building a fully vacuum compatible system. Oxygen content can be below 50 ppm when the pressure is at 1 atmosphere, e.g., when dealing with Ti powder particles.

Figure 2A:
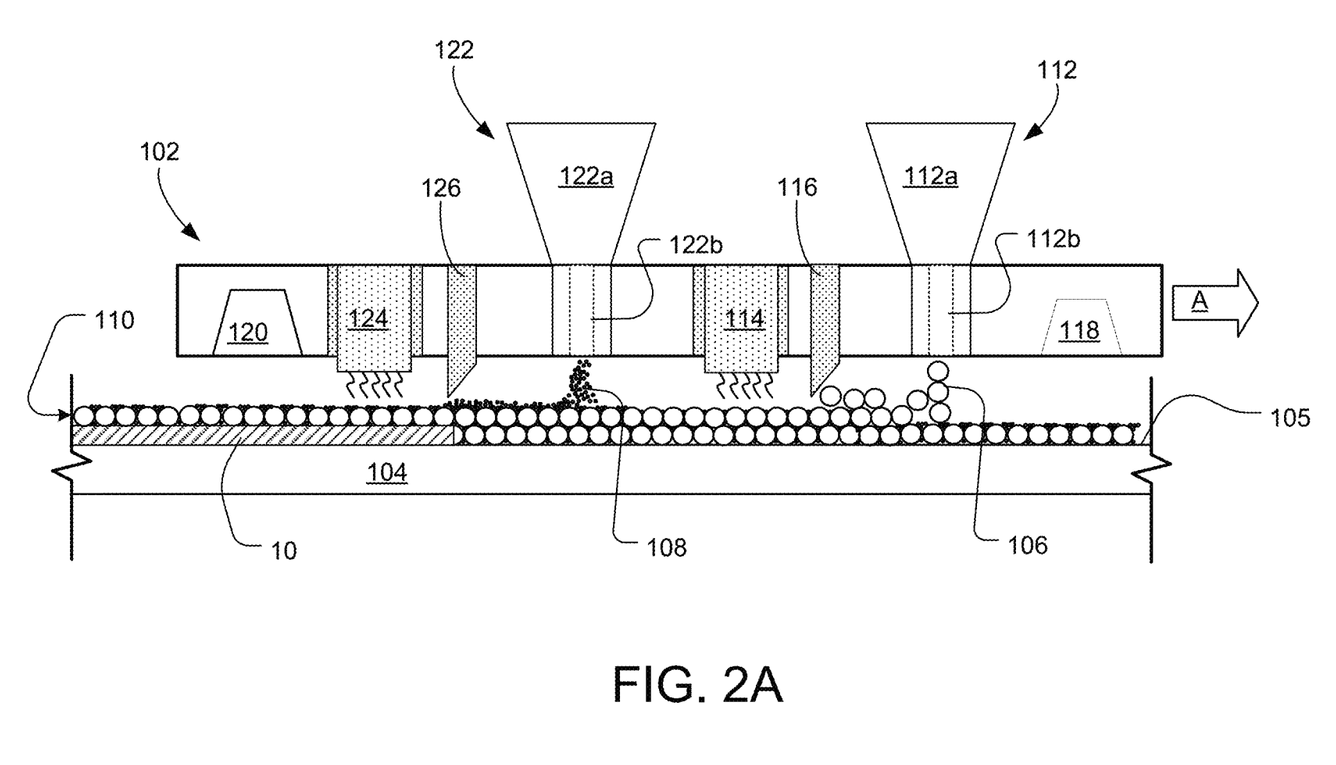
FIG. 2A is a schematic side views of a printhead from the additive manufacturing apparatus.
Figure 2B:
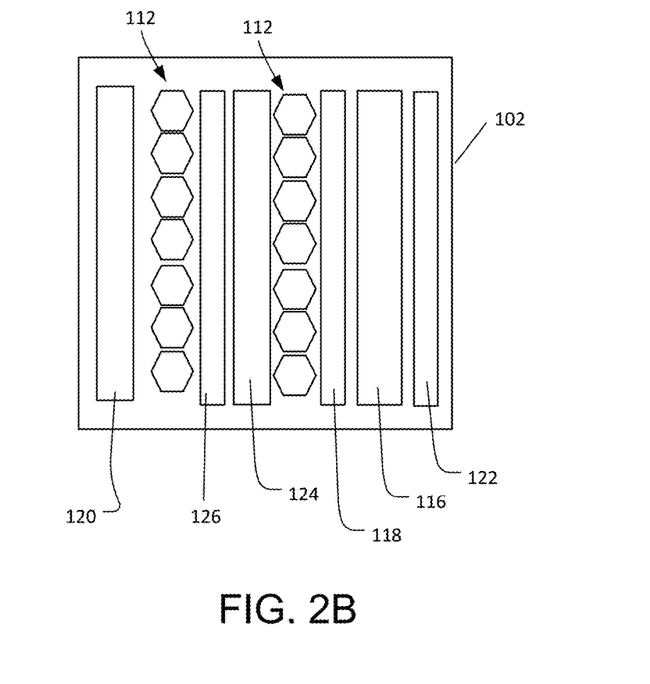
FIG. 2B is a schematic top view of a printhead, e.g., the printhead of FIG. 2A.
Figure 2C:
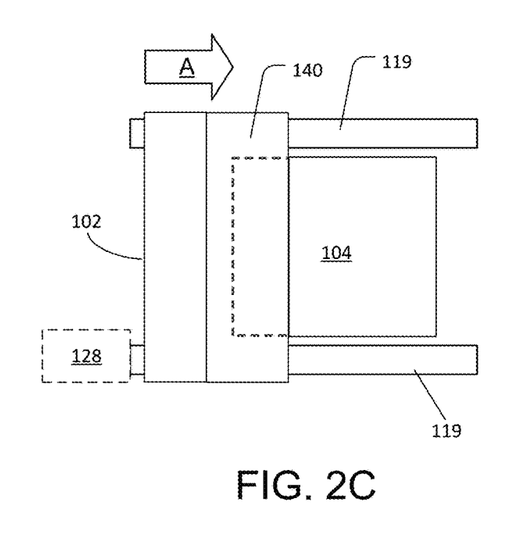
FIG. 2C is a schematic top view of the additive manufacturing apparatus.

Referring to FIGS. 1 and 2C, the printhead 102 is configured to traverse the platform 104 (shown by arrow A). For example, the apparatus 100 can include a support, e.g., a linear rail or pair of linear rails 119, along which the printhead can be moved by a linear actuator and/or motor. This permits the printhead 102 to move across the platform 104 along a first horizontal axis. In some implementations, the printhead 102 can also move along a second horizontal axis perpendicular to the first axis.

The printhead 102 can be held in a fixed vertical position, and the platform 104 can be lowered after each layer is deposited.

Referring to FIGS. 2A and 2B, the printhead 102 includes at least a first dispenser 112 to selectively dispense a layer 110 of a powder 106 on the build plate 104, e.g., directly on the build plate 104 or on a previously deposited layer. In the implementation illustrated in FIG. 2A, the first dispenser 112 includes a hopper 112a to receive the powder 106. The powder 106 can travel through a channel 112b having a controllable aperture, e.g., a valve, that controls whether the powder is dispensed onto the platform 104. In some implementations, the first dispenser 112 includes a plurality of independently controllable apertures, so that the powder can be controllably delivered along a line perpendicular to the direction of travel A.

Optionally, the printhead 102 can include a heater 114 to raise the temperature of the deposited powder. The heater 114 can heat the deposited powder to a temperature that is below its sintering or melting temperature. The heater 114 can be, for example, a heat lamp array. The heater 114 can be located, relative to the forward moving direction of the printhead 102, behind the first dispenser 112. As the printhead 102 moves in the forward direction, the heater 114 moves across the area where the first dispenser 112 was previously located.

Optionally, the printhead 102 can also include a first spreader 116, e.g., a roller or blade, that cooperates with first the dispensing system 112 to compact and spread powder dispensed by the first dispenser 112. The first spreader 116 can provide the layer with a substantially uniform thickness. In some cases, the first spreader 116 can press on the layer of powder to compact the powder.

The printhead 102 can also optionally include a first sensing system 118 and/or a second sensing system 120 to detect properties of the layer before and/or after the powder has been dispensed by the dispensing system 112.

In some implementations, the printhead 102 includes a second dispenser 122 to dispense a second powder 108. The second dispenser 122, if present, can be constructed similarly with a hopper 122a and channel 122b. A second spreader 126 can operate with the second dispenser 122 to spread and compact the second powder 108. A second heater 124 can be located, relative to the forward moving direction of the printhead 102, behind the second dispenser 122.

The first powder particles 106 can have a larger mean diameter than the second particle particles 108, e.g., by a factor of two or more. When the second powder particles 108 are dispensed on a layer of the first powder particles 106, the second powder particles 108 infiltrate the layer of first powder particles 106 to fill voids between the first powder particles 106. The second powder particles 108, being smaller than the first powder particles 106, can achieve a higher resolution, higher pre-sintering density, and/or a higher compaction rate.

Alternatively or in addition, if the apparatus 100 includes two types of powders, the first powder particles 106 can have a different sintering temperature than the second powder particles. For example, the first powder can have a lower sintering temperature than the second powder. In such implementations, the energy source 114 can be used to heat the entire layer of powder to a temperature such that the first particles fuse but the second powder does not fuse.

In implementations when multiple types of powders are used, the first and second dispensers 112, 122 can deliver the first and the second powder particles 106, 108 each into different selected areas, depending on the resolution requirement of the portion of the object to be formed.

Examples of metallic particles include metals, alloys and intermetallic alloys. Examples of materials for the metallic particles include titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene. Returning to FIG. 1, the apparatus 100 also includes a powder fusing assembly 140.

In some implementations, the powder fusing assembly 140 can translate across the build plate 104. The powder fusing assembly 140 includes at least one energy delivery system 150, e.g., a laser or electron gun, that can generate at least one beam 152, e.g., a light beam or electron beam, that is directed toward the uppermost layer of powder on the platform 104 and that can be used at least for fusing of the layer of powder on the platform 104. The beam 152 and/or another beam can be used for pre-heating and/or heat-treating the layer of powder.

The powder fusing assembly 140 also includes an air knife 200 to generate a flow of gas (shown by arrow 206) across the layer of powder. This flow of gas 206 can help reduce spatter caused by fusing of the powder by the light beam 152.

As noted above, the powder fusing assembly 140 can translate across the build plate 104. For example, the apparatus 100 can include a support, e.g., a linear rail or pair of linear rails 149, along which the powder fusing assembly 140 can be moved by a linear actuator and/or motor. In some implementations, the printhead 102 and the powder fusing assembly 140 are independently movable. In some implementations, the powder fusing assembly 140 can translate along the same direction (e.g., shown by arrow A) as the printhead 102. Alternatively, the powder fusing assembly 140 can translate along a horizontal direction perpendicular to direction travelled by the printhead.

In some implementations, the printhead 102 and powder fusing assembly 140 are supported by and movable on the same support, e.g., the linear rail or pair of linear rails 119. In some implementations, the printhead 102 and the powder fusing assembly 140 are physically connected (see FIG. 2B) in a fixed position relative to each other. In this case, the printhead 102 and powder fusing assembly 140 move together, e.g., by the same actuator or motor.

In some implementations, the printhead 102 and the powder fusing assembly 140 are mechanically coupled to the same vertical actuator such that both are movable up or down together. This permits the dispenser(s) and any beam scanner(s) of the powder fusing assembly to maintain a constant distance from the uppermost layer of powder on a layer-by-layer basis.

Referring to FIG. 1, the powder fusing assembly 140 can include a frame 142 to which various components, e.g., components of the energy delivery system 150 and the air knife 200, are secured. In some implementations, the printhead 102 is secured to the frame 142. Although FIG. 1 illustrates the frame 142 as a closed housing, this is not necessary; the frame could simply be an open framework sitting within the housing 130.

The powder fusing assembly 140 includes an open volume 144 that extends from the surface 105 of the build plate 104 to the optical components of the energy delivery system 150. The open volume 144 at least encompasses a field of view 154 of the energy delivery system 150, i.e., the region through which the light beam(s) 152 can sweep to scan the layer of powder. The air knife 200 is configured to generate the flow of gas 206 across a portion 146 of the open volume 144 that is adjacent the layer 110 on the build plate 104.

If the energy delivery system 150 includes at least one light source to generate at least one light beam 152, the energy deliver system 150 can also include at least one reflector assembly to scan the light beam 152 on the layer of powder.

In some implementations, at least one reflector assembly is configured to sweep a light beam along a substantially linear path on the uppermost layer. In particular, each sweep can be a linear path on the layer of powder along a direction B. The direction B can be perpendicular to the direction A of travel powder fusing assembly 140 (e.g., into or out of the page shown in FIG. 1), or parallel to the direction A of travel of the dispenser 102. In some implementations, the printhead 102 and the air knife 200 are movable, but the energy delivery system 150 is stationary. For example, the energy delivery system could include multiple lasers or electron guns with a combined field of view that spans the build plate 104.

Referring to FIG. 1, the powder fusing assembly 140 can also include a heat source 190. The heat source 190 can be used for pre-heating and/or heat treatment of the layer. The heat source 190 can include at least one array of heat lamps 192, e.g., infra-red lamps. For example, the heat source 190 can include a first array 192a of heat lamps positioned to illuminate a region before (relative to the direction of travel A) a linear scan region below the energy delivery system 150 to provide pre-heating of the layer 110, and a second array 192b of heat lamps positioned to illuminate a region after (relative to the direction of travel A) the linear scan region below the energy delivery system 150 to provide heat-treatment of the layer 110.

Each array of heat lamps 192 can be arranged along a plane that oblique relative to the top surface 105 of the build plate 104. This permits the heat lamps 192 to sit outside the field of view 154 of the energy delivery system 150.

Referring to FIG. 1, the air knife 200 includes a supply unit 202 and an exhaust unit 204. The supply unit 202 and the exhaust unit 204 are positioned on opposite sides of the powder fusing assembly 140. In particular, the supply unit 202 and the exhaust unit 204 can be positioned on opposite sides of the open volume 144. The supply unit 202 and the exhaust unit 204 can be constructed substantially identically, but as mirror images.

The apparatus 100 includes a controller 195 coupled to the various components of the apparatus, e.g., power sources for the light sources and heaters, actuators and/or motors to move the printhead 102 and powder fusing assembly 140, actuators and/or motors for the components, e.g., dispensers and beam scanners, within the printhead 102 and powder fusing assembly 140, etc., to cause the apparatus to perform the necessary operations to fabricate an object.

The controller 195 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 195 can generate instructions usable by each of the systems operable with the controller 195, for example, to dispense the powder 106, to fuse the powder 106, to move various systems of the apparatus 100, and to sense properties of the systems, powder, and/or the object 10. In some implementations, the controller 195 can control the first and second dispensing systems 112, 122 to selectively deliver the first and the second powder particles 106, 108 to different regions.

The controller 195, for example, can transmit control signals to drive mechanisms that move various components of the apparatus. In some implementations, the drive mechanisms can cause translation and/or rotation of these different systems, including. Each of the drive mechanisms can include one or more actuators, linkages, and other mechanical or electromechanical parts to enable movement of the components of the apparatus.

Powder Bin

Figure 3:
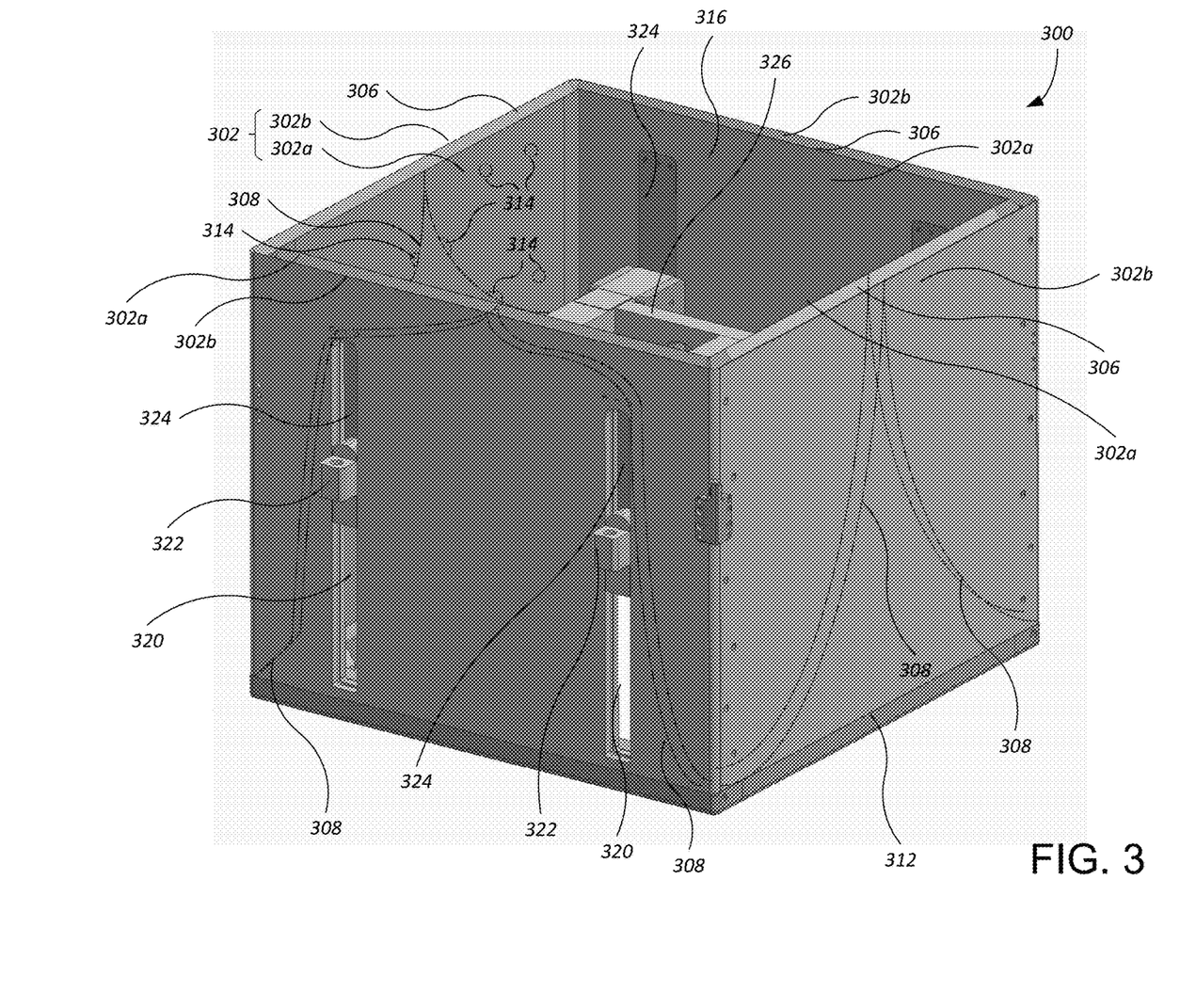
FIG. 3 is a perspective view of a powder bin.
Figure 4:
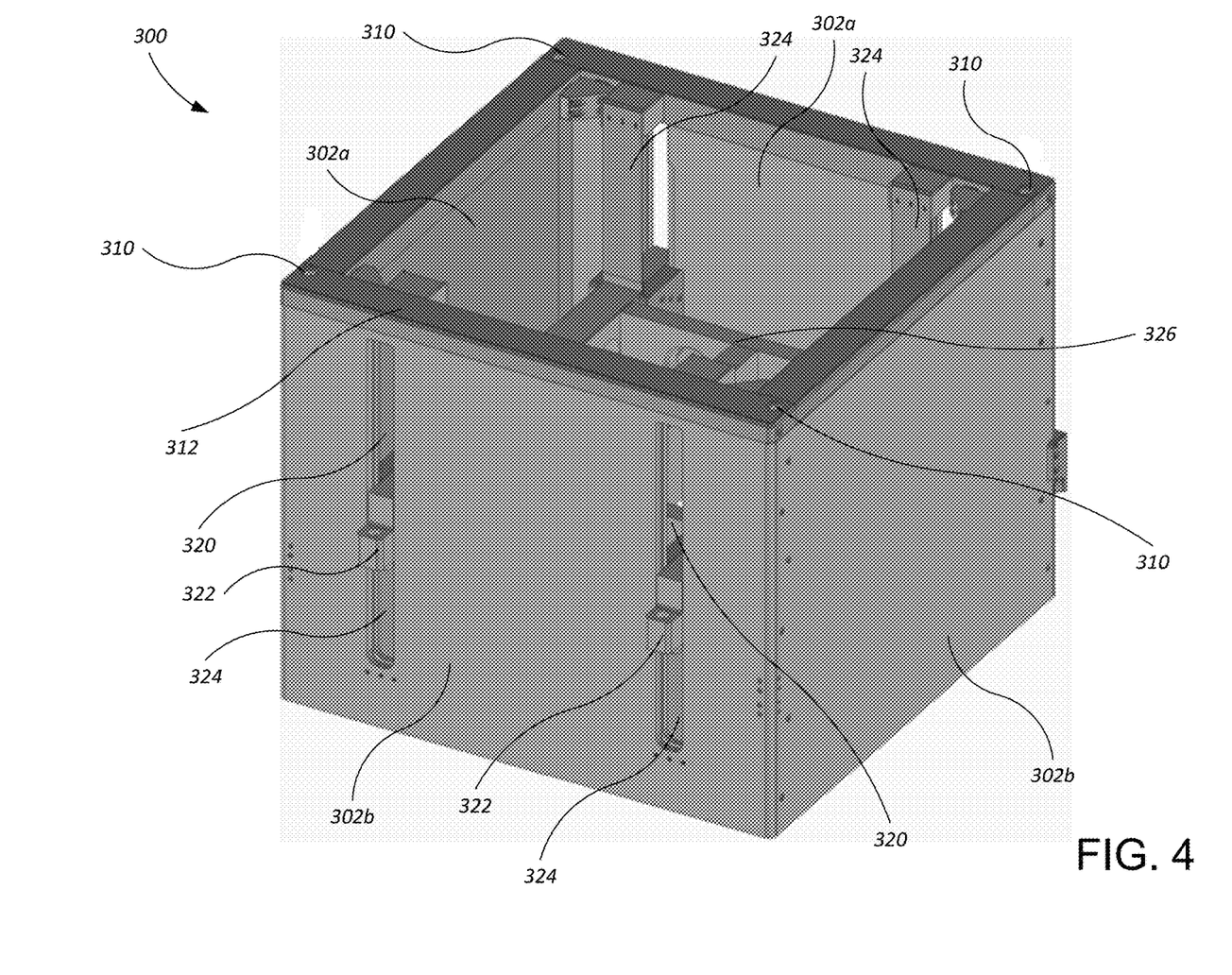
FIG. 4 is an upside-down perspective view of the powder bin of FIG. 3.
Figure 5:
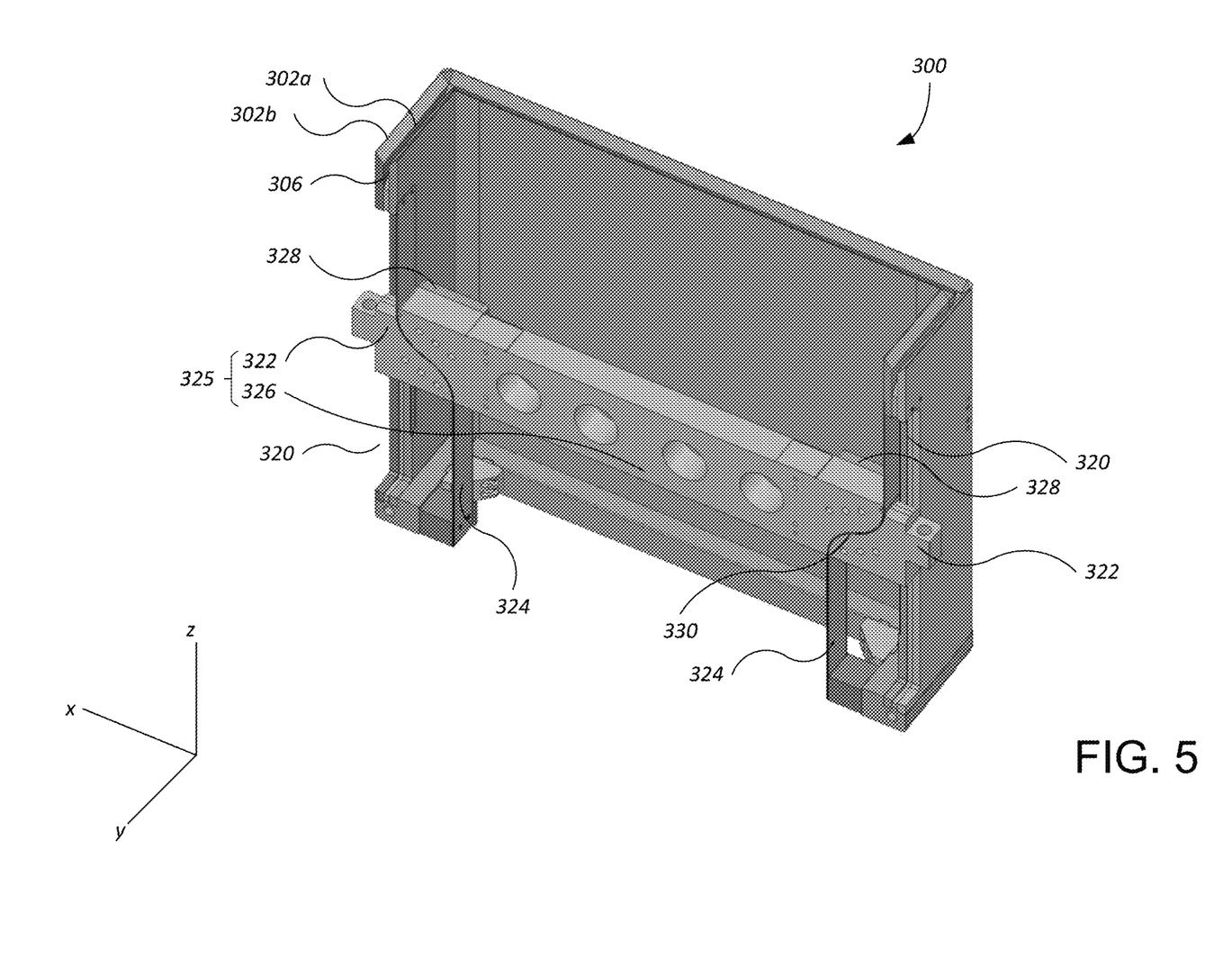
FIG. 5 is a cross-sectional view of the powder bin of FIG. 3.

Referring to FIGS. 1 and 3-5, a powder bin 300 is positioned to surround the build plate 104 during a build operation. The powder bin 300 can form an annular body, e.g., open at top and bottom, with the build plate 104 positioned in the interior 316 of the bin 300. The powder bin 300 has a plurality of walls 302 that include an annular inner wall 302a and an annular outer wall 302b. The inner wall 302a and the outer wall 302 are spaced apart to form a cavity 306 that provides a trough to collect powder as that travels over the side of the build plate 104, e.g., excess powder distributed by the printhead. The inner walls 302a and the outer walls 302b can be spaced 5 to 50 mm apart. The build plate 104 and the inner walls 302a can be spaced 1 to 5 mm apart.

Where the powder bin 300 is polygonal, e.g., rectangular, each segment of the inner wall 302a has two side edges that contact two side edges of adjacent faces of the inner wall 302a, and each segment of the outer wall 302b has two side edges that contact two side edges of adjacent faces of the outer wall 302. The bottom edge of the inner wall 302a and the bottom edge of the outer wall 302b contacts a base 312. Alternatively, the powder bin 300 can be cylindrical in shape.

Between the top edges of the inner wall 302a and outer wall 302b is an annular gap 304 configured to receive powder that travels over the side of the build plate 104, either from spilling off the build surface 110 or by being dispensed by the printhead over the gap 304. The powder that falls into the gap 304 can settle to the bottom of the cavity 306 to be collected from one or more ports 310 located in the base 312. For example, as illustrated in FIG. 4, there are four ports 310 located in the corners of the base 312. Unused powder that falls into the gap 304 can be then recycled for subsequent build operations. A vacuum source, e.g., a vacuum pump or facilities vacuum line (not illustrated) can be connected to the ports 310 to suction up the powder as it collects at the bottom of the cavity 306. Various techniques, e.g., filters or settling beds, can be used to separate out the powder into a collection reservoir after it is suctioned out of the powder bin 300. For example, the ports 310 can be connected to a powder reservoir (not illustrated) that receives the powder.

Within the cavity 306 can be a barrier 308 configured to channel powder to the ports 310. The barrier 308 can be sloped, e.g., a straight slope or a curved slope, that directs the powder to the ports 310. The sloped barrier 308 can ensure a smooth flow of powder under the influence of gravity to the ports 310. The sloped barrier 308 can ensure a smooth flow of powder under the influence of gravity to the ports 310. Optionally vacuum can also be applied to the ports 310 to assist gravity in flowing the powder toward the ports.

Optionally, one or more projections 314 can project from the slope 308 and/or project into the cavity 306 from the inner wall 302a and/or outer wall 302b. The projections 314 can help break up clumps of powder. This can assist in more laminar and less turbulent flow of powder through the cavity 306 and prevent clumps of powder from clogging the ports 310. The projections could be fins, bumps, or other protrusions.

The build plate 104 can be supported above a support structure 325 by one or more supports 322. The support structure 325 can have an inner structure 326 and struts 322. The build plate 104 can be spaced apart from the support structure 325, e.g., by 5 to 100 mm, to reduce heat transfer from the build plate 104 and the support structure 325. In addition, the horizontal cross sections of the one or more supports 322 used to separate the build plate 104 from the support structure 325 are small enough to limit heat transfer from the build plate 104 to the support structure 325. For example, each support 322 can be 5 to 50 mm in diameter (assuming a circular cross-section, although other geometric shapes are feasible). Beneath the support structure 325 is a kinematic mount assembly 600 (discussed in more detail below). Together, the build plate 104, supports 322 and support structure 325 can provide a build plate assembly.

One or more of the walls 303 can include one or more apertures 320. The one or more apertures 320 permit one or more struts 322 of the support structure 325 to pass through the one or more apertures 320. The one or more struts 322 can provide stabilization of the support structure 325 during a build operation. In some implementations, the one or more struts 322 can be connected to an actuator (e.g., actuators 608 connected to the body 626 secured to the struts 322, see FIG. 6) configured to drive the support structure 325 along the z-axis.

Figure 2D:
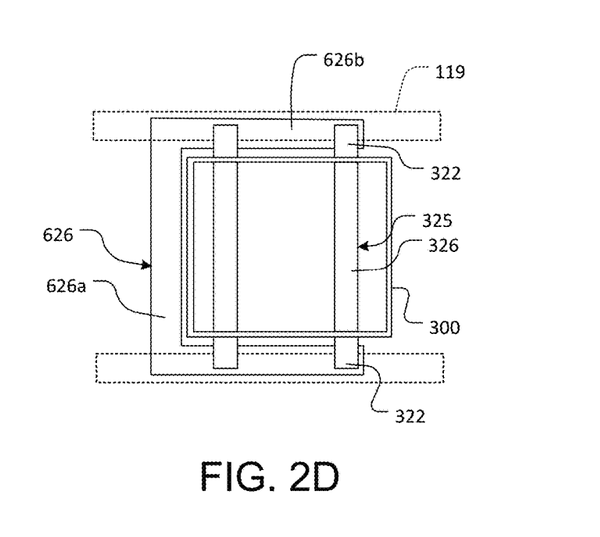
FIG. 2D is a schematic top view of the additive manufacturing apparatus at a location below the printhead.

As the support structure 325 recedes down into the bin 300 (e.g., as the support structure 325 descends along the z-axis following each subsequent layer of powder being dispensed onto the build plate 104), the inner surface of the inner walls 302a above the build plate 104 will gradually be exposed. This could permit the powder dispensed on the build plate 104 to pass through the one or more apertures 320. The powder could reach internal components of the apparatus 100, resulting in loss of the unused metal powder and potentially damaging electronics and other components of the apparatus 100. However, the apertures 320 can be sealed along the inner walls 302a such that powder is prevented from escaping the powder bin 300. In particular, to prevent powder from escaping the interior 316 of the powder bin 300, one or more flexible band seals 324 can pass through the support structure 325 and seal the one or more apertures 324. The flexible band seals 324 can maintain the seal as the support structure 325 descends into the powder bin 300. The support structure 325 can be held at opposite sides of the of the flexible band seal 324 using plates 328 that secure the strut 322 that is on the outside of the flexible band seal 324 to the inner structure 326 that is on the inside of the flexible band seal 324. An upper portion of the flexible band seal 324 lies flush with the inner wall 302a to cover the portion of the aperture 320 above the support structure 325. As the support structure 325 is lowered, the band seal 324 can slide through a channel 330 in the support structure 325, particularly between the strut 322 and the inner structure 326. The channel 330 is shaped to cause the flexible band seal 324 to press against the edges of the aperture 320 as the support structure 325 moves down, sealing the aperture 320 to prevent the powder from escaping the powder bin 300. In some implementations, the flexible band seal 324 can press against a recessed edge (not illustrated) of the inner wall 302a such that the flexible band seal 324, when pressed against the recessed edge of the inner wall 302a, lies flush with the inner wall 302a. The flexible band seal 324 can be made of corrosion resistant materials, such as alloys made of stainless steel, chrome, nickel, iron, copper, cobalt, molybdenum, tungsten, and/or titanium. To be flexible, the flexible band seal 324 can have multiple thin layers of corrosion resistant materials Kinematic Mount Assembly Referring to FIGS. 1, 2D and 6, a kinematic mount assembly 600 for the support structure 325 has a body 626 that can support the support structure 325. In particular, the body 626 can extend along the sides of the powder bin 300 through which the struts 322 extend. For example, the body 626 can be a U-shaped body with base 626a and two extending arms 626b. The arms 626b extend along the exterior sides of the powder bin 300 below the struts 323 that project laterally out from the powder bin 300 (see FIGS. 1 and 2C). Thus, when the body 626 is lifted vertically, it can carry the support structure 325

Figure 6:
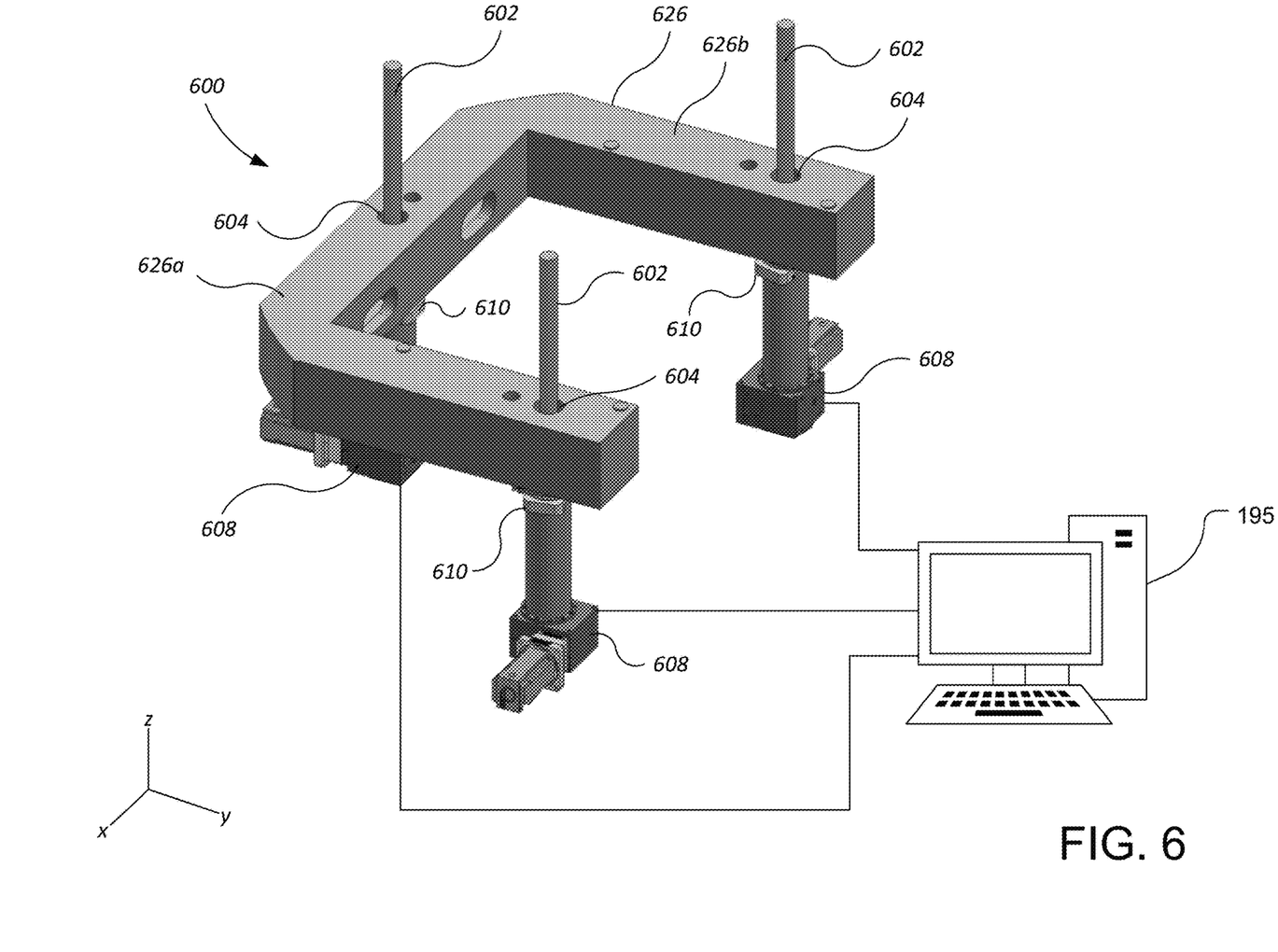
FIG. 6 is a schematic view of a kinematic mount for a build plate.

Focusing on FIG. 6, the kinematic mount assembly 600 can include three or more actuators. Each actuator can be a screw jack actuator; a motor 608 from which a rotatable screw 602 extends. The screw 602 extends through a threaded aperture in a kinematic mount 610 and through a hole 604 in the body 626. Each kinematic mount 610 is configured to vertically support a point on the body 626, while permitting the body 626 to pitch and/or roll. Each motor 608 is configured to rotate the screw 602, thereby driving the kinematic mount 610 vertically along the rod 602. Thus, the combined positions of the kinematic mounts 610 as set by the motors 608 control the vertical height of the body 626 (and of the support structure 325), as well as the tilt of the body 626 (and of the support structure 325) about the two perpendicular horizontal axes. Alternatively, the drive components could be replaced by another linear actuator such as a hydraulic motor, pneumatic motor, electric motor, or other similar motor or actuator that causes the kinematic mount 610 to move along the z-axis. The motors 608 can be connected to the controller 195.

As the build plate 104 warps, flexes, dishes, expands, or deforms under various heat conditions, and as powder is dispensed and weighs down on the build plate 104, the build plate 104 (and accordingly, the support structure 325 beneath the build plate 104) can tilt from a horizontal starting position. Each mount 610 is independently vertically movable, as each motor 608 can independently drive a mount 610 along an associated screw 602. By driving the mounts 610 vertically relative to one another, the kinematic mount assembly 600 can cause the build plate 104 to tilt about either or both horizontal perpendicular axes. Thus, the kinematic mount assembly 600 can be used to compensate for any tilt of the build plate 104 (e.g., due to heat and weight conditions) to maintain a desired planarity relative to the starting position of the build plate 104 and the layers of the powder.

Referring to FIGS. 1 and 6, a sensor 199 can be used to detect the tilt of the top surface of a build object on the build plate 104. For example, the sensor 199 can be an optical sensor that measures different portions of the top surface 105 of the build plate 104 and the layers of powder dispensed on the build plate 104. The sensor 199 can send the measurements to the controller 195. The controller 195, which can be independently connected to each motor 608, can then cause the motors 608 to drive each rod 602 up and down to bring the build plate 104 to a desired tilt angle, e.g., such that the top surface of the build plate 104 or the uppermost layer of the powder is horizontal.

Removable Assembly

Returning to FIG. 1, the entirety of the powder bin 300, and the build plate assembly including the build plate 104, support structure 325 form a removable module 620 that can be removed as a unit from the apparatus 100. For example, a port 625 can be provided in the walls of the housing 130. The module 620 can be placed on a movable support 630 that can pass through the port 625. For example, the movable support 630 could be a dolly with a frame 632 and rollers 634, or on a frame that is movable along linear rails by an actuator. The module 620 can be move into position in the apparatus 100, e.g., through the port 625, on the dolly. Then the kinematic mount 600 can lift the module 620 off the support 630 into a preset vertical position relative to other components, e.g., the energy delivery system 150. Further vertical motion of the build plate assembly, e.g., to lower the build plate 104 on a layer-by-layer basis, can also be provided by the kinematic mount assembly 600. When the part is completed, the kinematic mount 600 lower the support body 626 so that the module 620 is again resting on the movable support 630. Then the port 625 can be opened and the module moved, e.g., rolled or slid, out of the apparatus 100.

Conclusion

The controller and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

A number of implementations have been described. Nevertheless, it will be understood that various modifications may be made. Accordingly, other implementations are within the scope of the claims.

What is claimed is:

1. A powder bin for an additive manufacturing apparatus comprising:
a plurality of walls forming an annular body to surround a build plate of the additive manufacturing apparatus, the plurality of walls including an annular outer wall and an annular inner wall that are separated by a cavity, wherein a gap between a top edge of the inner wall and a top edge of the outer wall is configured to receive powder between the top edges of the outer wall and the inner wall, and wherein the annular body has an aperture that extends laterally through the inner wall and outer wall;
a base connected to a bottom edge of the outer wall and a bottom edge of the inner wall, wherein the base includes one or more ports; and
a sloped barrier in the cavity configured to direct powder around the aperture to the one or more ports in the base.

2. The powder bin of claim 1, wherein one or more projections configured to break up a turbulent flow of powder extend from at least one of the plurality of walls inwardly into the cavity.

3. The apparatus of claim 1, wherein the annular body is a rectangular body.

4. The powder bin of claim 3, wherein the annular body has a first pair of apertures through a first face of the rectangular body and a second pair of apertures through an opposite second face of the rectangular body.

5. The powder bin of claim 4, wherein the first pair of apertures and the second pair of apertures are parallel linear slots.

6. The powder bin of claim 3, wherein the one or more ports comprise four ports positioned at four corners of the rectangular body.

7. The apparatus of claim 1, wherein the annular body is a cylindrical body.

8. The powder bin of claim 1, wherein the aperture comprises a linear slot.

9. The powder bin of claim 8, wherein the barrier forms a curved slope.

10. The powder bin of claim 8, wherein the barrier forms a linear slope.

11. The powder bin of claim 1, further comprising a vacuum source connected to the ports.

12. A powder bin assembly for an additive manufacturing apparatus comprising:
a plurality of walls forming an annular body to surround a build plate of the additive manufacturing apparatus, the plurality of walls including an annular outer wall and an annular inner wall that are separated by a cavity, wherein a gap between a top edge of the inner wall and a top edge of the outer wall is configured to receive powder between the top edges of the outer wall and the inner wall, and wherein and annular body has an aperture that extends laterally through the inner wall and outer wall;
a support structure including an inner structure positioned within an interior of the powder bin assembly and a strut that extends through the aperture and is moveable in the aperture; and
a flexible band seal configured to slide through a channel in the support structure as the support structure moves downward and to cover a portion of the aperture above the support structure.

13. The assembly of claim 12, wherein the annular body is a rectangular body.

14. The assembly of claim 13, wherein the annular body has a first pair of apertures through a first face of the rectangular body and a second pair of apertures through an opposite second face of the rectangular body, and the powder bin comprises a plurality of flexible band seals with each band seal of the plurality to cover an associate aperture.

15. The assembly of claim 14, wherein the first pair of apertures and the second pair of apertures are parallel linear slots.

16. The assembly of claim 12, wherein the flexible band seal is a corrosion resistant materials.

17. The assembly of claim 16, wherein the flexible band seal includes a band of stainless steel, chrome, nickel, iron, copper, cobalt, molybdenum, tungsten, and/or titanium.

18. The assembly of claim 17, wherein the flexible band seal has multiple thin layers of different corrosion resistant materials.

19. The assembly of claim 12, wherein the channel passes between an inner structure and a strut of the support structure.

20. The assembly of claim 19, wherein the channel is configured to press a portion of the flexible band seal above the support structure to lie flat against the inner wall.

21. The assembly of claim 12, wherein the aperture is a sealed passage through the body from the inner wall to the outer wall.

* * * * *

UNITED STATES PATENT AND TRADEMARK OFFICE
CERTIFICATE OF CORRECTION

| | |
|---|---|
| PATENT NO. | : 11,203,153 B2 |
| APPLICATION NO. | : 16/653912 |
| DATED | : December 21, 2021 |
| INVENTOR(S) | : Erez Shmuel and Mahendran Chidambaram |

It is certified that error appears in the above-identified patent and that said Letters Patent is hereby corrected as shown below:

In the Claims

Column 11, Line 25, Claim 3, delete "apparatus" and insert --powder bin-- therefor.

Column 11, Line 37, Claim 7, delete "apparatus" and insert --powder bin-- therefor.

Signed and Sealed this
Third Day of May, 2022

Katherine Kelly Vidal
*Director of the United States Patent and Trademark Office*